United States Patent [19]
Chambers

[11] Patent Number: 6,145,041
[45] Date of Patent: Nov. 7, 2000

[54] REMOTE MULTI-LEVEL CONTROL BUS

[75] Inventor: Kennith L. Chambers, Denton, Tex.

[73] Assignee: Alcatel USA Sourcing, LP

[21] Appl. No.: 09/065,430

[22] Filed: Apr. 24, 1998

[51] Int. Cl.[7] ...................................................... G06F 13/00

[52] U.S. Cl. ................................. 710/110; 714/23; 700/3

[58] Field of Search .................................. 710/110, 104;
700/3; 709/208, 209; 714/2, 23

[56] References Cited

U.S. PATENT DOCUMENTS

| | | | |
|---|---|---|---|
| 4,803,682 | 2/1989 | Hara et al. ................................... | 714/23 |
| 5,003,466 | 3/1991 | Schan, Jr. et al. .......................... | 714/41 |
| 5,727,169 | 3/1998 | Calzi ........................................ | 710/104 |

*Primary Examiner*—Glenn A. Auve
*Attorney, Agent, or Firm*—Locke Liddell & Sapp LLP

[57] ABSTRACT

A communications bus for providing communication between a master processor and a plurality of slave processors, each including a central processing unit, the slave processors located remote from the master processor, the bus selectively resets a slave processor and includes first, second, third and fourth communication paths. The first communication path transmits signals including destination addresses from the master processor to each of the plurality of slave processors. The second communication path transmits a strobe signal from the master processor to each of the plurality of slave processors. The strobe signal has first and second states. The third communication path transmits a reset signal from the master processor to each of the plurality of slave processors. The reset signal has first and second states. The fourth communication path transmits a disable signal from the master processor to each of the plurality of slave processors. The disable signal has first and second states. The addressed slave processor when the strobe signal is in the first state is reset when the reset signal is in the first state and the disable signal is in the first state. The central processing unit of the address slave processor is reset when the strobe signal is in the first state and the reset signal is in the first state and the disable signal is in the second state. The central processing unit of the addressed slave processor exits reset when the reset signal is in the second state and the disable signal is in either the first or second state.

2 Claims, 2 Drawing Sheets

REMOTE MULTI-LEVEL CONTROL BUS

TECHNICAL FIELD OF THE INVENTION

The present invention relates to a communications bus, and more particularly, to a high level data link control communications bus for providing communication between a master processor and remotely disposed slave processors for providing multiple reset levels to the slave processors.

BACKGROUND OF THE INVENTION

Communications systems typically require a use of multiple printed circuit boards housed on various shelves within a frame or rack. Various printed circuit boards control different functions and are required to communicate with boards on different shelves and with boards located at different frames. Typically, high level data commands generated by master microprocessors are required to communicate with lower level functions found on multiple cards.

Where a slave card is malfunctioning, it is necessary to determine whether the card is malfunctioning in order to take corrective action, such as resetting the card or disabling the slave card to prevent jamming of the communications bus between the master card and the plurality of slave cards. A resetting of a slave card may require separate communication paths to each card which results in a multiple wire cable for the disable or reset function.

A need has thus arisen for a control bus having the ability to selectively enable or disable slave to master communication and to reset slave cards.

SUMMARY OF THE INVENTION

A communications bus for providing communication between a master processor and a plurality of slave processors, each including a central processing unit, the slave processors located remote from the master processor, the bus selectively resets a slave processor. The communications bus includes first, second, third and fourth communication paths. The first communication path transmits signals including destination addresses from the master processor to each of the plurality of slave processors. The second communication path transmits a strobe signal from the master processor to each of the plurality of slave processors. The strobe signal has first and second states. The third communication path transmits a reset signal from the master processor to each of the plurality of slave processors. The reset signal has first and second states. The fourth communication path transmits a disable signal from the master processor to each of the plurality of slave processors. The disable signal has first and second states. The addressed slave processor when the strobe signal is in the first state is reset when the reset signal is in the first state and the disable signal is in the first state. The central processing unit of the address slave processor is reset when the strobe signal is in the first state and the reset signal is in the first state and the disable signal is in the second state. The central processing unit of the addressed slave processor exits reset when the reset signal is in the second state and the disable signal is in either the first or second state.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
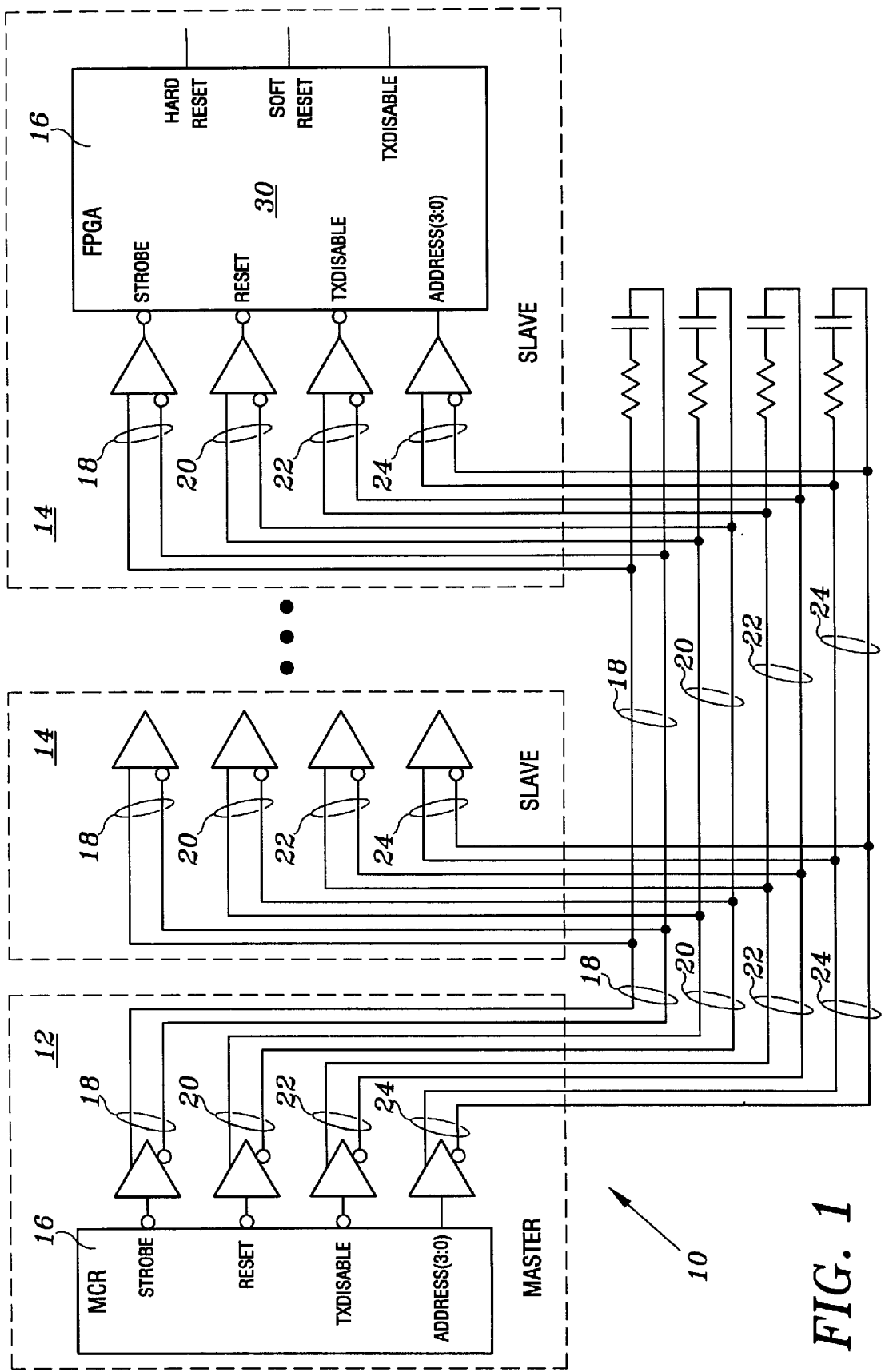
FIG. 1 is a schematic block diagram of the present bus circuit.

Referring to FIG. 1, the present high level data link control (HDLC) communications bus is illustrated, and is generally identified by the numeral 10. Communications bus 10 provides a full duplex communication between a single master microprocessor 12 and a plurality of slave processors 14. Master microprocessor 12 and slave microprocessors 14 may include, for example, a model MC68360 quad integrated communication controller 16 manufactured and sold by Motorola, Inc. Bus 10 connects multiple microprocessors 14 on multiple cards remotely disposed from microprocessor 12.

Associated with master microprocessor 12 is a module configuration register (MCR) which generates strobe, reset, transmit disable, and address signals to each of the plurality of slave microprocessors 14. The strobe signal has low and high states, and is transmitted over bus 10 on communication path 18. The reset signal has low and high states and is transmitted over a communication path 20 within communication bus 10. The transmit disable signal has low and high states and is transmitted over communication path 22 within bus 10. The address signal may comprise, for example, a four bit address and is transmitted over communication path 24 within bus 10. Communication paths 18, 20, 22, and 24 each comprise a differential twisted pair connecting master microprocessor 12 to each of the plurality of slave microprocessors 14 through RS-422 drivers and receivers. Communications bus 10 therefore comprises seven differential pairs.

Each slave microprocessor 14 includes a field programmable gate array (FPGA) 30 which receives the strobe, reset, transmit disable, and address via communication paths 18, 20, 22, and 24, respectively. Field programmable gate array 30 generates a hard reset, soft reset, and transmit disable signal to microprocessor 14. The hard reset signal resets all functions on a slave board where microprocessor 14 resides, whereas the soft reset signal resets the central processing unit of the slave board. The transmit disable signal disables data transmission from the slave board.

The present bus 10 provides the capability for the master microprocessor 12 to selectively enable or disable slave to master communication, and to selectively reset a slave board. The particular combination of the state of the reset and transmit disable signals determine the type of reset for the slave card where microprocessor 14 resides. When the reset bit is active, the level of reset is defined by the transmit disable bit state. When the reset bit is inactive, the transmit disable bit defines the command state of transmit disable for the master card which issued the command.

When the master card location of microprocessor 12 addresses a particular slave card via communications path 24, and the strobe signal is low on communications path 18 indicating to the slave card that a command and address is valid on bus 10, the following patterns of states of the reset signal and transmit disable signal result in the following resets:

Reset State Low, Transmit Disable State Low:

This command resets the addressed slave microprocessor similar to a power-up reset. The slave board automatically exits full board reset after approximately 0.40 to 1 second.

Reset Signal Low, Transmit Disable Signal High:

The central processing unit only is reset with transmit disable. This command resets the central processing unit section of the addressed slave microprocessor 14. The data traffic or time associated functions are not affected. The slave central processing unit remains in the reset state until commanded to exit reset or a full board reset is issued.

Reset Signal High, Transmit Disable Signal Low:

This command signals the central processing unit of the addressed slave 14 to exit reset. The slave central processing unit will exit reset after approximately 0.2 to 0.5 seconds. This command will have no effect on the slave microprocessor 14 whose central processing unit is not in reset. Bus 20 communication transmitter for the bus which sent the command is disabled.

Reset Signal High, Transmit Disable Signal High:

This command signals the central processing unit of the addressed slave to exit reset. The slave central processing unit will exit reset after approximately 0.2 to 0.5 second. This command will have no effect on the slave whose central processing unit is not in reset. If the transmitter is already enabled, it will remain enabled.

Figure 2:
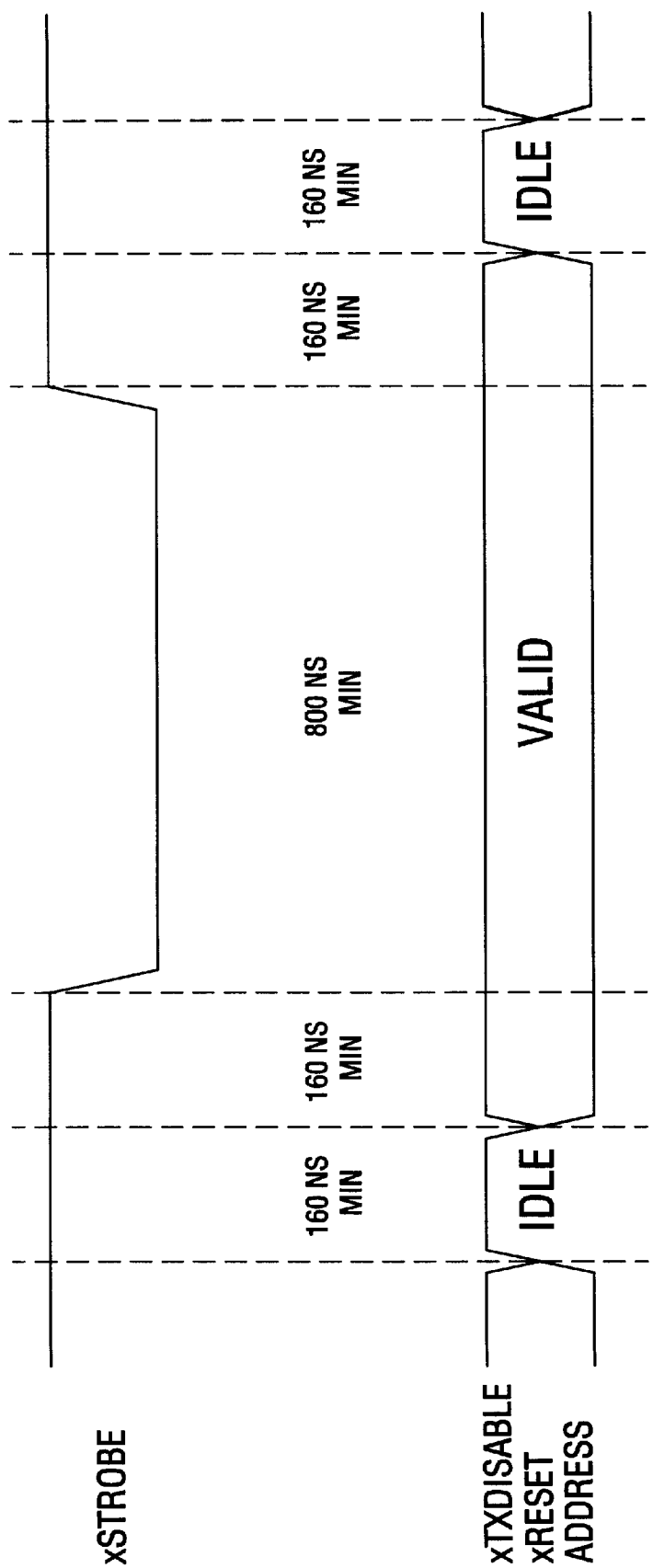
FIG. 2 is a clock timing diagram.

FIG. 2 illustrates the timing required by the slave microprocessor 14 for a bus 10 command to be verified as valid and execution started.

It therefore can be seen that the present communications bus allows for card resetting over communication lines to ensure a reset of a slave board as opposed to the use of separate reset lines from a master card to each of multiple slave cards. Reset takes place over the same communication lines that are utilized between a master microprocessor and plural slave microprocessors.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A communications bus for providing communication between a master processor and a plurality of slave processors each including a central processing unit, the slave processors located remote from the master processor, the communications bus, comprising:

a first communication path for transmitting signals including destination addresses from the master processor to each of the plurality of slave processors;

a second communication path for transmitting a strobe signal from the master processors to each of the plurality of slave processors, the strobe signal having first and second states;

a third communication path for transmitting a reset signal from the master processor to each of the plurality of slave processors, the reset signal having first and second states;

a fourth communication path for transmitting a disable signal from the master processor to each of the plurality of slave processors, the disable signal having first and second states; and such that when one of the plurality of slave processors is addressed via said first communication path, and said strobe signal is in said first state, the addressed slave processor is reset when said reset signal is in said first state and said disable signal is in said first state, the central processing unit of the addressed slave is reset when said reset signal is in said first state and said disable signal is in said second state, and the central processing unit of the addressed slave processor exits reset when said reset signal is in said second state and said disable signal is in said first or second state.

2. The communication bus of claim 1 wherein said first, second, third, and fourth communications paths each comprise differential twisted pair paths.

* * * * *